June 16, 1953     H. GRIMSON ET AL     2,642,565
CONTROL APPARATUS FOR LAUNDRY AND WASHING MACHINES
Filed Sept. 13, 1952     3 Sheets-Sheet 1
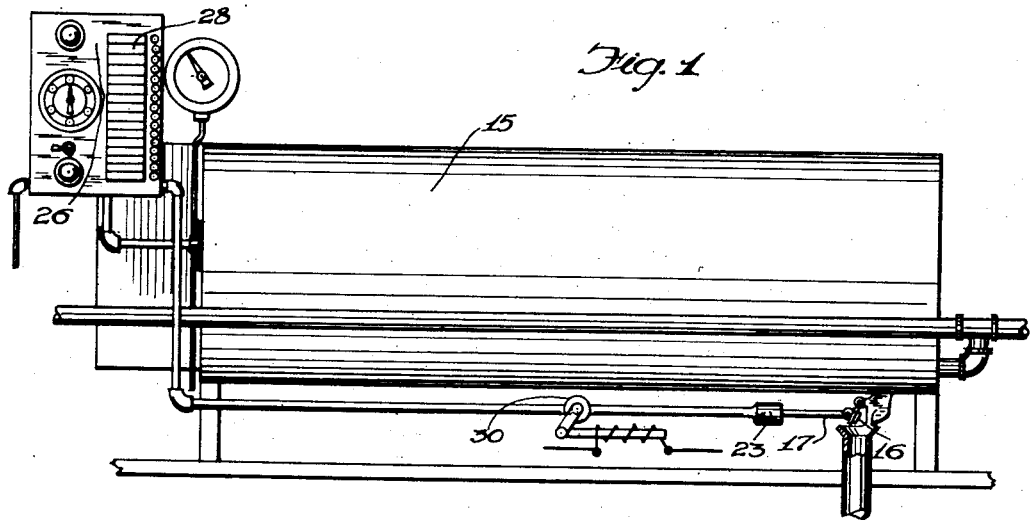
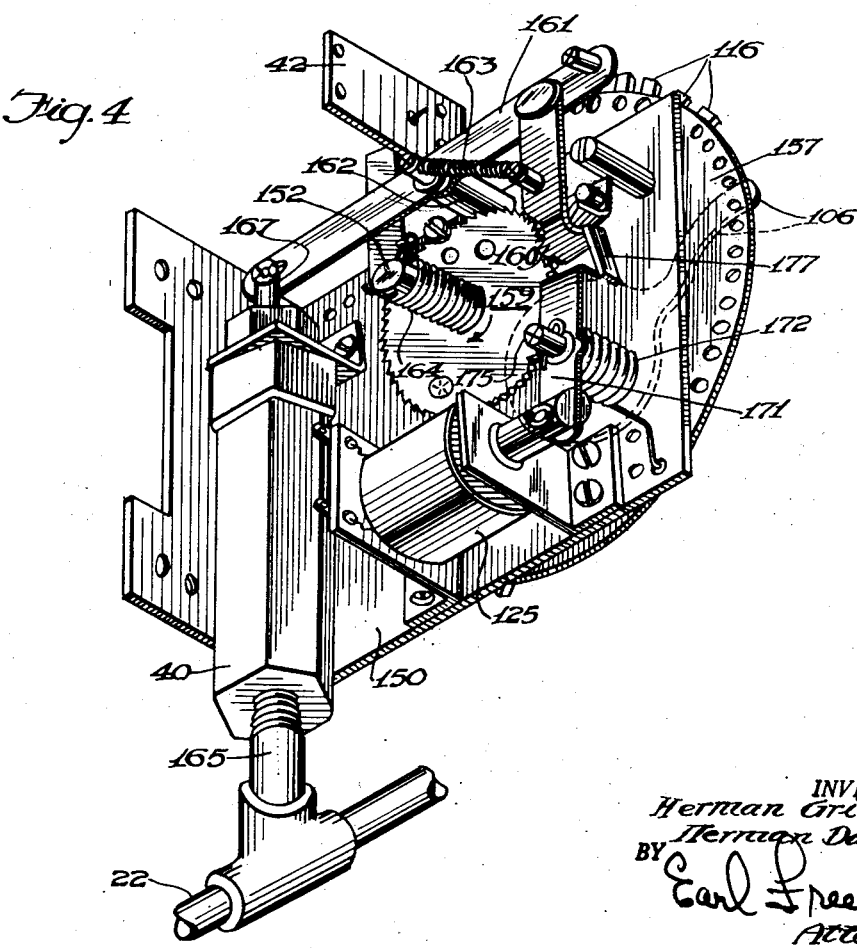
INVENTORS:
Herman Grimson
Herman Davis
BY Earl Freeman
Attorney

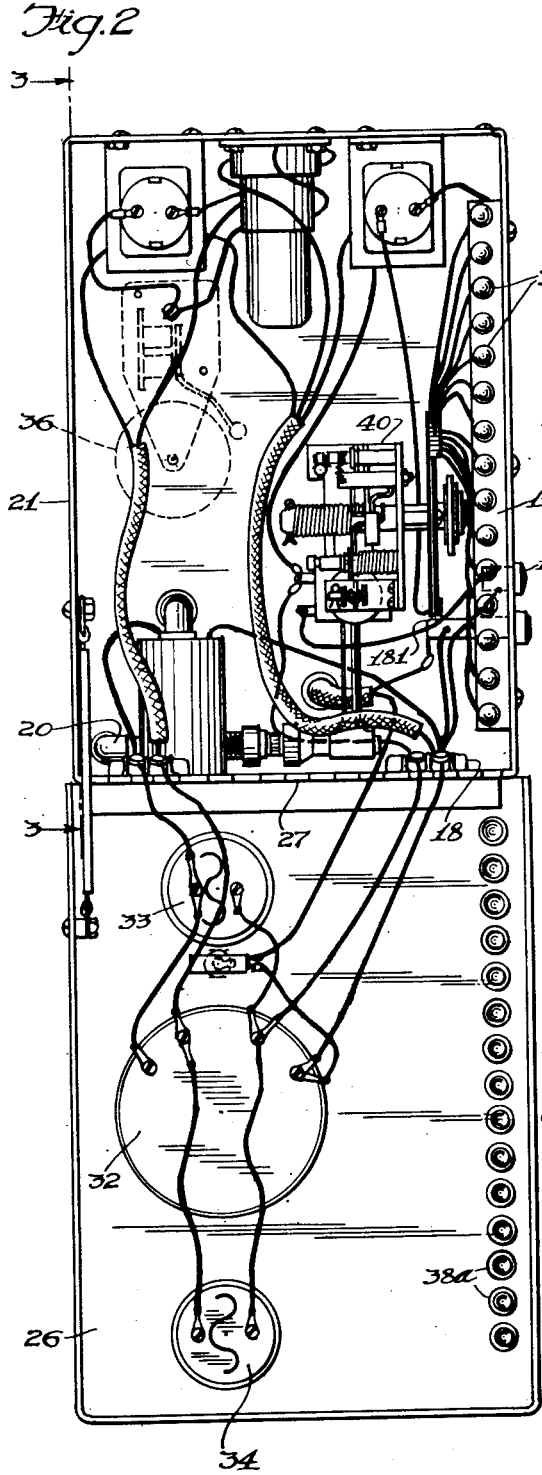
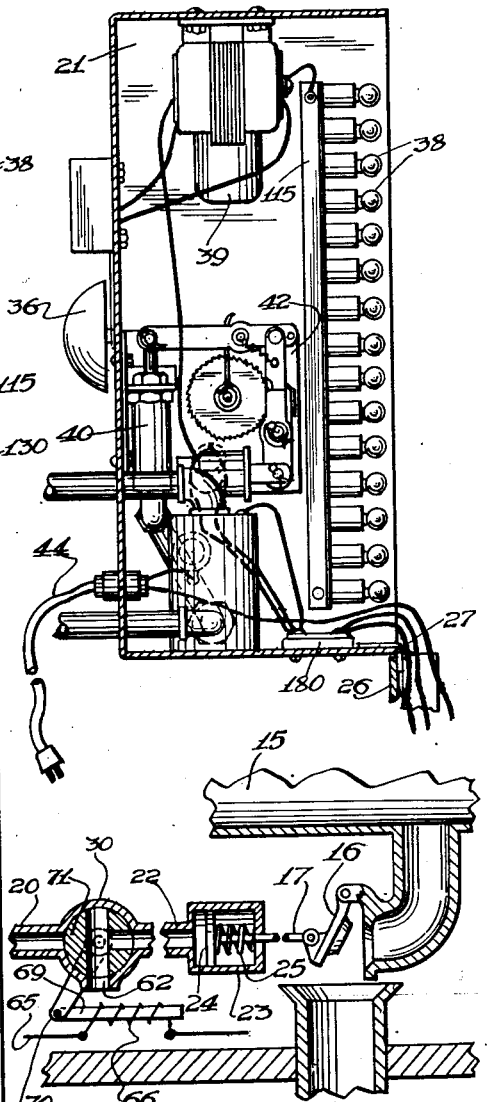

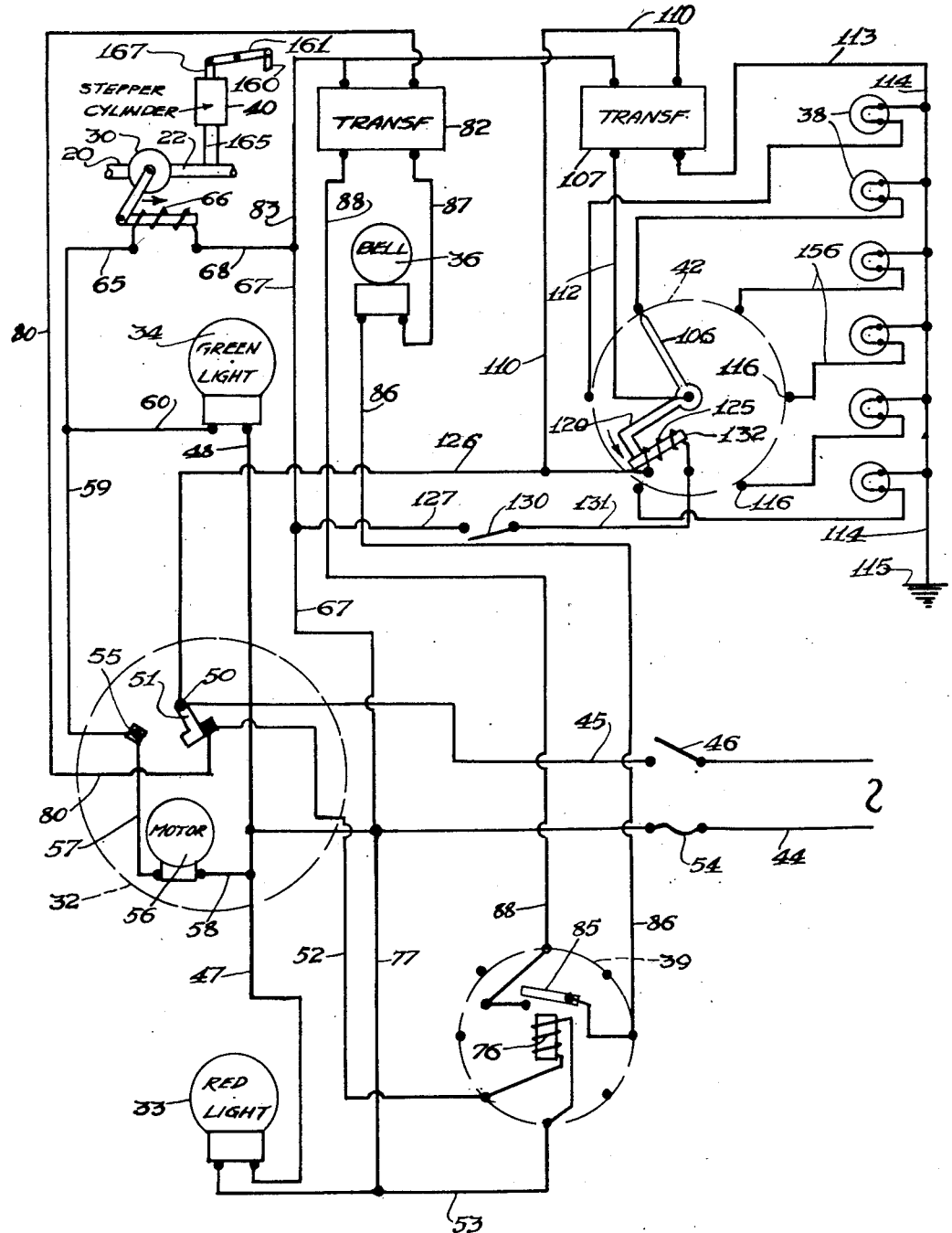

Patented June 16, 1953

2,642,565

UNITED STATES PATENT OFFICE 2,642,565

CONTROL APPARATUS FOR LAUNDRY AND WASHING MACHINES

Herman Grimson and Herman Davis,
Chicago, Ill.

Application September 13, 1952, Serial No. 309,538

5 Claims. (Cl. 340—223)

Our invention relates to washing machines such as are generally used in laundry or cleaning establishments, and more particularly to means for controlling the operations thereof. Washing machines in such establishments are usually of the long cylindrical type and designed to receive a variety or succession of treatments for the clothes disposed therein. Thus, one application may be a solution with a washing powder, the next a flushing liquid at a desired temperature, the next a solution of suds, the next a rinse, and so on. Usually, a prescribed sequence of treatments is inscribed or otherwise marked on a chart, and the time for such treatments noted. However, the proper timing of the treatments, as well as determining which treatment is going on, are incidents which are often uncertain to the attendant of the washing machine and render it difficult to ascertain whether the treatments have been properly administered. It is therefore one object of the present invention to provide an apparatus accessory to the washing machine which is semi-automatic, requiring only the periodical setting of the time for each treatment by manual means, the apparatus fixing the duration of the treatments automatically after this has been done.

A further object is to provide an apparatus of the above character which automatically indicates by visual means which treatment indicated on the chart is in operation.

A still further object is to provide a control which procures the automatic draining of the washing machine when a treatment of its contents has been completed.

Another object is to provide an element which automatically indicates the draining periods between, or the conclusion of individual treatments.

An additional object is to provide an element which automatically indicates that a treatment is in process.

Another object is to provide an audible alarm to indicate when the washing machine has become empty and is ready to have a new treatment administered to its contents.

A further object is to provide an air-operated closing device for the washing machine drain, an electrical control for the same, and an auxiliary indicator for the sequence of washing machine treatments, such indicator being actuated by the said control.

An important object is to provide a manual resetting element operable at the end of the series of treatments to set the apparatus into original position for the next job or series of treatments to be received by the washing machine.

With the above objects in view, a better understanding of the invention may be had by reference to the accompanying drawings, in which—

Fig. 1 is a front elevation of a typical washing machine used in laundries and the like showing the novel apparatus positioned at one end of the same;

Fig. 2 is a front elevation with the frontal panel of the apparatus swung down in the manner of a door to expose its inner side and the interior of the apparatus;

Fig. 3 is a side view of the interior of the apparatus as seen from the line 3—3 of Fig. 2;

Fig. 4 is a perspective view of a stepper unit which procures the sequential indication of the washing machine treatments;

Fig. 5 is a fragmental assembly of parts making up a drain control; and

Fig. 6 is a diagrammatic view of the electrical circuit employed in the apparatus.

In accordance with the foregoing, reference to Fig. 1 indicates the washing machine as a long horizontal cylinder 15 which receives the various pipes incident to its filling, temperature indication, etc. The filling of the cylinder is controlled manually; but its discharge is controlled by the novel apparatus. Thus, Fig. 1 shows a gate or valve 16 below the bottom of the cylinder equipped with a rod 17 which is operated to open and close the valve. The closing of the valve is induced by compressed air contained in a feed pipe 20 which passes through the novel control apparatus 21 and continues as indicated at 22 to a cylinder 23 in which a plunger 24 is contained, as shown in Fig. 5. This plunger acts through the rod 17 to maintain the valve 16 in the closed position; and a spring 25 behind the plunger 24 acts to back the plunger for the opening of the valve when the air pressure is released, the last operation being one procured automatically in the control apparatus as will be explained in a later section. The apparatus 21 has the form of a casing which receives a frontal panel 26 hinged as indicated at 27 to the bottom of the casing. The panel carries a rack 28 in which cards (not shown) making up the formula chart for the washing machine are insertible.

The novel apparatus includes a timer which is set for a period incident to a given machine operation, such as five or ten minutes. The filling of the machine cylinder 15 and the setting of the timer are done manually; and when the timer is set, the apparatus automatically closes the drain valve 16 to retain the solution or other substances contained in the cylinder. When the operation is concluded, the timer acts to open the drain valve 16 for the discharge of the solution. While the operation is going on the apparatus shows a green light. However, when the timer acts to open the drain valve, the green light goes out and a red light is turned on as an indication to the attendant that the machine is draining. A given time—such as twenty seconds is allowed by a secondary timing element for the draining operation and a bell alarm put into action when the draining period has expired, so that the attendant has a final notice that a given operation of the washing machine has ended, and that a new solution or treatment—the next one indicated on the chart—may be introduced into the washing machine and the process repeated. Every time this is done, the control apparatus acts through a stepper switch to put on a signal light forming part of a series corresponding to that of the treatments, so that the attendant may know any time the machine is in operation which treatment in the series is in process. Finally, when the series of treatments has been concluded, a push button may be actuated by the attendant to return the control to the position necessary to initiate a new series of treatments for the next job handled by the washing machine.

The control apparatus contains an assembly of units in an electrical circuit designed to accomplish the results just enumerated. Thus, one unit is a control valve 30 for the compressed air pipe 20; and others are the timer 32, the red light 33, the green light 34, the alarm bell 36, the signal lights 38, a 20-second thermal relay 39, a pneumatic stepper unit control 40, and a stepper unit 42. The electrical circuit receives its current from a 110-volt supply cord 44 carried by the control apparatus.

It is proper to initiate the explanation of the electrical circuit according to the inactive or draining period of the washing machine, that is, when the red light is in operation. As noted in the wiring diagram, the electric current mains entering the control apparatus are indicated at 44 and 45, and they include a starting switch 46 which is open when the washing machine is not in use, but closed when its period of use is to begin. The current main 44 continues with a branch 47 leading to one terminal of the red light 33, and another branch 48 leading to one terminal of the green light 34. However, the current main 45, after passing through the switch 46, leads directly to the pivot 50 of a rotary arm 51 carried by the timer 32. Before it is actuated manually for the timing operation, this arm is in contact with a conductor 52 which leads through the heater 76 of the thermal relay 39, and by way of a continuation 53 of the latter to the other terminal of the red light 33, so that it may now be assumed that the closing of the starting switch 46 immediately procures the operation of the red light 33. A safety fuse 54 is interposed in the current main 44.

The operation of the red light 33 may either be interpreted as a draining period for the washing machine or simply that the operation of the machine is to be started. If this is the case, the attendant fills the machine with the proper solution for the first treatment and then draws the timer arm 51 to the left—as seen in the circuit diagram—to make contact with a post 55. This action breaks the circuit of the red light 33 and institutes the operation of a motor 56 within the timer unit by way of a conductor 57 leading to one terminal thereof. A conductor 58 leads from the other terminal of the motor to the main 44, completing the motor circuit. This circuit has a continuation 59 from the post 55 leading through a branch 60 to the other terminal of the green light 34; and the conductor 48 now serves through the main 44 to complete the circuit of the green light, so that the same is on while the motor 56 is in operation.

While the red light was on to indicate the draining or inaction of the washing machine, an inactive condition was also present in the feed pipe continuation 22. Thus, reference to Fig. 5 shows that the valve 30 between the feed pipe 20 and its continuation 22 is set to block the communication of compressed air from the feed pipe to the continuation by means of a T-passage or other suitable expedient, such passage affording a vent 62 to the atmosphere to enable the plunger 24 of the cylinder 23 to be backed by the spring 25 for holding the drain valve 16 open as shown. However, it is necessary that this drain valve be closed when the machine is filled and put into operation; and a unit in the motor circuit accomplishes the closing of the valve when the timer goes into action. Thus, a continuation 65 of the motor lead 59 goes to one terminal of a solenoid 66, while a continuation 67 of the current main 44 leads by means of a branch 68 to the other terminal of the solenoid. Fig. 5 shows that the armature 69 of the solenoid has a control arm 70 for the core 71 of the compressed air valve 30, so that when the motor circuit is closed, the solenoid acts in the direction of the arrow in Fig. 6 to rotate the core 71 a quarter-turn counterclockwise from the position shown in Fig. 5 and establish communication of compressed air between the feed pipe 20 and its continuation 22. Now the plunger 24 is advanced to close the drain valve 16.

It follows, after the timer has been in operation the prescribed period for the particular washing treatment, that its control arm 51 returns to its original position, cutting off the motor, the green light, and the solenoid 66. Now the solenoid armature returns to its original position restoring the air valve 71 to the position shown in Fig. 5, which establishes the vent 62. Now the plunger 24 in cylinder 23 is free to respond to the expansive tendency of the spring 25, opening the drain valve 16. The return of the timer arm 51 turns on the red light as an indication that the treatment is completed and draining has begun.

On the completion of a treatment the circuit of the red light sets the thermal relay 39 in action. Thus, the conductor 52 was mentioned as leading to one terminal of the relay heater 76, while a branch 77 of the current main 44 leads through the conductor 53 to the other terminal of the heater. The latter controls a circuit affecting the alarm bell 36, such circuit involving a branch 80 from the conductor 52 leading to one input terminal of a transformer 82, while the other input terminal leads through a branch 83 to the conductor 67 and main 44. The transformer creates a 6-volt circuit which is closed by the action of the heater 76 on a bi-metal armature 85. This circuit involves a conductor 86 from such armature to one terminal of the bell 36, a conductor 87 from the other terminal thereof to one output terminal of the transformer 82, and a conductor 88 from the other output terminal to the opposite terminal of the armature 85. Obviously, this circuit is created because alarm bells generally run on 6-volt current; and it follows that—with the relay timed for twenty seconds—the action of the bell will commence after the red light has been on for that period; and such light and bell continue in action until the timer arm 51 is again actuated for the next treatment, or the starting switch 46 is opened at the end of the working day.

A device is employed, when the timer is put into operation by the closing of the arm 51, to energize the first one in the series of signal bulbs 38 and indicate that the first washing treatment is in process during the operation of the timer; and the said device branches off from the air pipe continuation 22 for the control of a rotary switch 106 carried by the stepper unit 42. This switch is in a circuit controlled by a transformer 107, the latter receiving its 110-volt current from the main 45 through the switch 46 and a conductor 110 to one input terminal of the transformer, and from the current main 44 through the conductor 67 to the conductor 83 and the other input terminal of the transformer. One output terminal of the transformer goes to the pivot of the switch 106 by way of a conductor 112, while a lead 113 goes from the other output terminal of the transformer to a line 114 which is grounded at 115, the ground being a long strip of metal secured in the casing of the apparatus. This strip carries the series of light bulbs 38 which face jeweled frontal lenses 38a carried by the frontal panel 26. One of the terminals of the bulbs 38 leads from the ground wire 114, while the companion terminals of the bulbs are arranged along the periphery of the stepper as indicated at 116 in the diagram. While as many as fifteen bulbs may be mounted in the apparatus to designate as many sequential operations of the washing machine, the diagram shows only six for purposes of clear illustration. The pneumatic stepper unit control and the stepper unit mechanism—which are described in a later section—automatically advance the switch 106 in respect to the consecutive contacts 116 when the timer control arm 51 is closed on the post 55. Thus, the first time this occurs the top bulb 38 will be lighted; the second time, the second bulb from the top will be lighted and the first one cut out, and so on, so that each bulb serves as a signal in sequence of the consecutive periods of washing operation.

When the switch 106 of the stepper unit has advanced through the entire series of bulb control, this is an indication that the washing of the particular job has been concluded, and that the apparatus should be reset for the next job. The present circuit has a branch making this possible through the agency of a return member 120 operable in the stepper unit and motivated by electrical means in the opposite direction. Thus, the member 120 is associated with a solenoid 125 to one of whose terminals extends a continuation 126 of the current main 45. A branch 127 is taken from the conductor 67 leading from the main 44 to one terminal of a button switch 130, while a conductor 131 leads from the other terminal of this switch to the opposite terminal of the solenoid 125. When the button 130 is pressed, the armature 132 of the solenoid recedes, permitting the member 120 to advance in the direction indicated by the arrow opposite it with the effect of returning the switch 106 to its original position. The release of the button 130 of course immediately renders the return portion of the circuit inactive, so that the stepped advance of the switch 106 during the next washing operation will occur as usual.

The stepper switch may be of any approved design productive of the desired results, and one popular model is illustrated. Thus, Fig. 4 shows that the switch is built on an angle plate 150, in which a horizontal shaft 152 is journaled for rotation. The shaft carries the radial switch arm 106 designed to apply in succession to the circular series of terminals 116 from which wires 156 lead to one of the terminals of the signal lamps 38, the terminals 116 being mounted on an insulation disc 157 carried by the base plate 150. The shaft 152 carries a ratchet wheel 159 against which is applied a pawl 160 carried by one end of a rocker arm 161 pivoted to the angle plate 150 at 162, with a draw spring 163 leading to the pawl 160. The rotation of the ratchet wheel is influenced in the direction of the arrow in Fig. 4 by the unwinding action of a spring 164 coiled around the shaft 152. The control of the ratchet wheel is accomplished by way of a branch 165 from the air pipe continuation 22, the branch leading into the cylinder 40 containing a plunger whose rod 167 extends to connect with the other end of the rocker arm 161. Thus, when the timer control arm is closed on the post 55 and air permitted to pass into the pipe continuation 22 for the closing of the washing machine drain valve 16, the action of the air by way of the pipe branch 165 will be to actuate the rocker arm 161 in a direction to impart a short turn to the ratchet wheel and a corresponding winding influence on the spring 164. The switch arm 106 will thus pass to the next terminal 116 and procure the lighting of the next lamp 38 in the operation-indicating series.

The solenoid 132 is carried by the base plate 150 and acts when energized to draw on a detent 171 applied by a coil spring 172 to the periphery of the ratchet wheel 159, the detent and coil spring being mounted on a pin 175 carried by the angle plate. The pawl 160 has a wing 177 in the rising path of the detent 171, so that when the latter is actuated, it lifts the pawl, releasing the ratchet wheel 159 to the influence of the spring 164. The ratchet wheel thus turns back to its original position, carrying the contact arm 106 back to the first terminal of the lamps 38. The stepper switch is thus reset for the next job of the washing machine.

Figs. 2 and 3 show intermediate wiring connectors 180 and 181 not considered necessary in the wiring diagram.

It will now be apparent that the novel control unit is an apparatus which requires only manual assistance to anticipate or set the time for each operation in the washing machine, but procures the automatic discharge of fluid from the latter at the end of the period for which each operation is timed. In such event, the red light goes into action as a signal that the washing machine is being emptied; and the bell rings after the red light is on a predetermined time to apprise the attendant—first visually, and then both visually and audibly—that the washing machine is ready for the next operation or treatment, in case the operator is not nearby or is attending to some other task while the washing machine is being emptied of its fluid contents. When subsequent treatments are instituted or in process the series of signal lamps registers the sequence and presence of each treatment or operation prescribed on the chart of the control unit, this being accomplished positively by the pneumatically-controlled feed of the ratchet wheel 159; and when the last operation has been concluded, the attendant may actuate the button switch 130 to reset the signal lamps for the next job or series of treatments. All the incidents in the control of the operations as described are accomplished by means of a compact assembly of simple instrumentalities which function in accordance with well established mechanical and electrical principles. Thus, a handy accessory is provided for washing machines and the like for operating the same along efficient lines with a minimum of attention.

We claim:

1. A control apparatus for a washing machine designed to accomplish a number of operations in consecutive order comprising a series of indicators representative of said operations, a drain closure for the washing machine including a duct receiving a compressed air feed, a valve in the duct designed to create a passage from said feed to a continuation of the duct and operable to a position closing the feed, a mechanism having a step-by-step motion and operative to energize said indicators in consecutive order, and an actuator for said mechanism connected to said continuation.

2. A control apparatus for a washing machine designed to accomplish a number of operations in consecutive order comprising a series of indicators representative of said operations, a drain closure for the washing machine including a duct receiving a compressed air feed, a valve in the duct designed to create a passage from said feed to a continuation of the duct and operable to a position closing the feed, a mechanism having a step-by-step motion and operative to energize said indicators in consecutive order, and a pneumatic actuator for said mechanism connected to said continuation.

3. The structure of claim 2, the mechanism including a control arm, and said actuator comprising a branch of said continuation leading into one end of a cylinder, a piston operable in the cylinder, and a rod from the piston extending from the other end of the cylinder to connect with said control arm, whereby to actuate the mechanism when the continuation receives air pressure.

4. A control apparatus for a washing machine designed to accomplish a number of operations in consecutive order comprising a series of indicators representative of said operations, a timer adapted to be set manually to institute and time each operation, a mechanism having a step-by-step motion and operative to energize said indicators in consecutive order, and pneumatic means actuated by the setting of the timer to impart the motion of one step to said mechanism to operate a given indicator in said series.

5. A control apparatus for a washing machine designed to accomplish a number of operations in consecutive order comprising a series of indicators representative of said operations, a timer adapted to be set manually to institute and time each operation, a mechanism having a step-by-step motion and operative to energize said indicators in consecutive order, and pneumatic means actuated by each setting of the timer to impart motion in succeeding steps to said mechanism and actuate the indicators according to said operations.

HERMAN GRIMSON.
HERMAN DAVIS.

References Cited in the file of this patent

UNITED STATES PATENTS

| Number | Name | Date |
|---|---|---|
| 957,591 | Wengelin | May 10, 1910 |
| 2,430,122 | Grace, Jr. | Nov. 4, 1947 |